United States Patent
Liang et al.

(10) Patent No.: US 8,543,127 B2
(45) Date of Patent: Sep. 24, 2013

(54) MOBILE STATION REGISTRATION WITH TIMING RE-ALLOCATION AND DE-ALLOCATION

(75) Inventors: Yu Feng Liang, Tachikawa (JP); Akito Kitahashi, Kyoto (JP)

(73) Assignee: JVC Kenwood Corporation, Yokohama-shi (JP)

(*) Notice: Subject to any disclaimer, the term of this patent is extended or adjusted under 35 U.S.C. 154(b) by 0 days.

(21) Appl. No.: 13/434,351

(22) Filed: Mar. 29, 2012

(65) Prior Publication Data
US 2012/0252450 A1 Oct. 4, 2012

(30) Foreign Application Priority Data
Mar. 31, 2011 (JP) ................. 2011-077962

(51) Int. Cl.
*H04W 72/00* (2009.01)
(52) U.S. Cl.
USPC ........ 455/452.1; 455/450; 455/438; 455/443; 370/331; 370/329; 370/314
(58) Field of Classification Search
None
See application file for complete search history.

(56) References Cited

U.S. PATENT DOCUMENTS

| 2006/0073836 A1* | 4/2006 | Laroia et al. | 455/450 |
| 2009/0209256 A1* | 8/2009 | Nakashima et al. | 455/436 |
| 2010/0309866 A1* | 12/2010 | Katayama et al. | 370/329 |
| 2010/0330994 A1* | 12/2010 | Matsuo et al. | 455/436 |

FOREIGN PATENT DOCUMENTS
JP 6-029897 A 2/1994

* cited by examiner

*Primary Examiner* — Marcos Batista
*Assistant Examiner* — Keith Fang
(74) *Attorney, Agent, or Firm* — Venable LLP; Michael A. Sartori; Tamatane J. Aga

(57) ABSTRACT

A wireless communication system includes a plurality of mobile stations and a base station which periodically receives a predetermined kind of information from one or more registered mobile stations registered in the base station among the plurality of mobile stations via a radio channel shared among the registered mobile stations. The base station determines a transmission interval of the information for the registered mobile stations in accordance with the number of the registered mobile stations, allocates transmission timings of the information for the registered mobile stations to be different among the registered mobile stations in the transmission interval, and notifies the registered mobile station of the transmission interval and the transmission timing. Each one of the registered mobile stations periodically sends out the information to the radio channel in accordance with the transmission interval and the transmission timing.

7 Claims, 8 Drawing Sheets

MOBILE STATION REGISTRATION WITH TIMING RE-ALLOCATION AND DE-ALLOCATION

CROSS-REFERENCE TO RELATED APPLICATIONS

The present application claims priority to and incorporates by reference the entire contents of Japanese Patent Application No. 2011-077962 filed in Japan on Mar. 31, 2011.

BACKGROUND OF THE INVENTION

1. Field of the Invention

The present invention relates to a base station, a mobile station, a wireless communication system, and a method for controlling the base station and the mobile station, and particularly relates to a technology for transmitting information from each mobile station to the base station via a radio channel shared among a plurality of mobile stations (hereinafter may be referred to as the shared channel).

2. Description of the Related Art

Cited as an applied example of the above information transmission technology is a wireless communication system that collects location information of a plurality of mobile stations on a base station side. The wireless communication system is suitable for a use for displaying and monitoring the location of each mobile station on a map.

Generally, the location information is collected as each one of the mobile stations transmits its location information acquired from GPS (Global Positioning System) to the base station via the shared channel.

Here, in order to avoid contention over the transmission timing of the location information among the mobile stations, one of the following two modes is adopted in many cases as the transmission mode of the location information.

Transmission Mode 1

This mode is, generally, that the mobile station transmits the location information at the request of the base station. Specifically, the base station transmits a polling signal sequentially to all active mobile stations to request their location information. Each one of the mobile stations replies to the base station with the location information as a response to the polling signal.

Transmission Mode 2

This mode is, generally, that the mobile station autonomously transmits the location information to the base station. Specifically, the mobile station periodically transmits the location information to the base station in accordance with a preset transmission interval and time mark, considering the maximum number of mobile stations that can be accommodated by the base station, the number of traffic channels, and the like. Here, the transmission interval indicates the time interval during which the mobile station needs to transmit the location information. Moreover, the time mark indicates the transmission timing of the location information that is different from one another among the mobile stations, and an offset time value from UTC (Universal Time Coordinated) or an identifier thereof is set therefore.

It is desirable to set the frequency of transmission of the location information by the mobile station as high as possible to appropriately monitor the location of the mobile station in the above wireless communication system. To put it another way, it is necessary to improve efficiency in information transmission from the mobile station to the base station. However, there is a problem in the transmission modes 1 and 2 that efficiency in information transmission is low.

Specifically, in the transmission mode 1, a polling signal from the base station to the mobile station oppresses the band of the shared channel. Therefore, it is not possible to allocate a sufficient time to transmit information to each one of the mobile stations, and efficiency in information transmission decreases (theoretically, the transmission mode 1 requires communication time twice as long as time required by the transmission mode 2). As a reference technology, Japanese Laid-open Patent Publication No. 06-29897 discloses a wireless communication system where mobile stations are divided into a plurality of groups, and a base station polls the mobile stations sequentially in the group on a group basis. However, if all the active mobile stations are requested to transmit information, polling signals oppresses the band of the shared channel similarly to the transmission mode 1, and again efficiency in information transmission decreases.

On the other hand, in the transmission mode 2, the transmission interval is set in accordance with the maximum number of mobile stations that can be accommodated by the base station. Therefore, depending on the operating status of the mobile station, efficiency in information transmission may decrease. For example, assume that the maximum number of mobile stations that can be accommodated by the base station is "180", and a time necessary for the mobile station to transmit the location information is "one second". In this case, the transmission interval is set to "180 seconds". However, the active mobile stations need to transmit the location information at intervals of "180 seconds" under the condition that a part of mobile stations are active. To put it another way, many idle periods when no information is transmitted on the shared channel may occur.

SUMMARY OF THE INVENTION

According to the present invention, it is possible to improve efficiency in information transmission from the mobile station to the base station via the shared channel.

It is an object of the present invention to at least partially solve the problems in the conventional technology.

According to an aspect of the present invention, a wireless communication system includes: a plurality of mobile stations; and a base station which periodically receives a predetermined kind of information from one or more registered mobile stations registered in the base station among the plurality of mobile stations via a radio channel shared among the registered mobile stations. The base station determines a transmission interval of the information for the registered mobile stations in accordance with the number of the registered mobile stations, allocates transmission timings of the information for the registered mobile stations to be different among the registered mobile stations in the transmission interval, and notifies the registered mobile station of the transmission interval and the transmission timing. Each one of the registered mobile stations periodically sends out the information to the radio channel in accordance with the transmission interval and the transmission timing.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
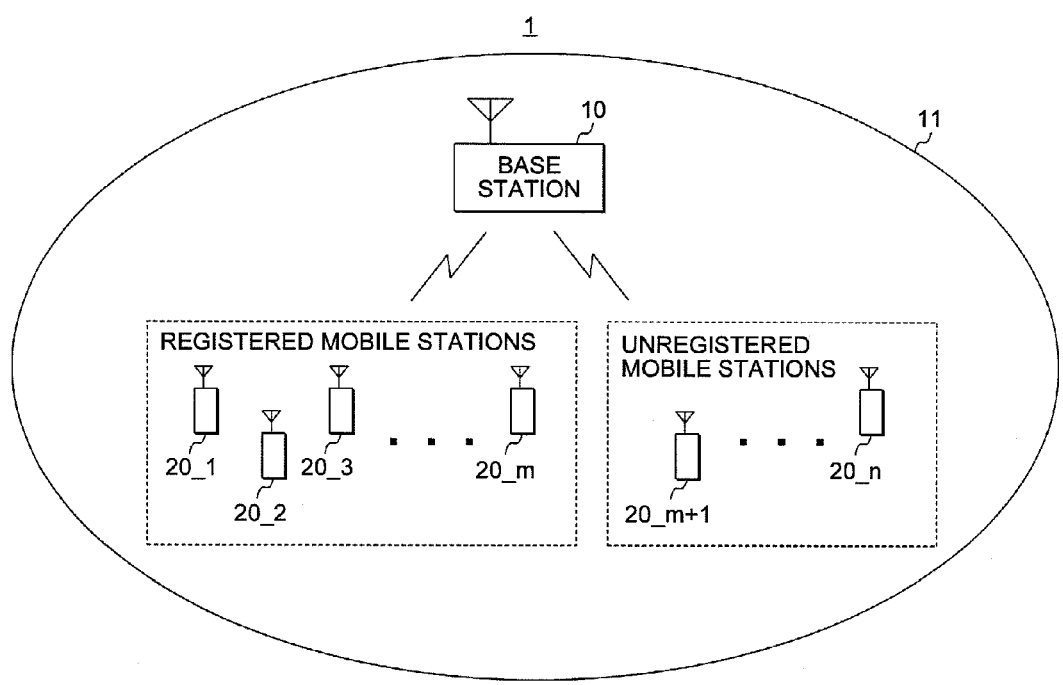
FIG. 1 is a block diagram illustrating a configuration example of a wireless communication system according to a first embodiment of the present invention.

A description will hereinafter be given of a first embodiment and a second embodiment of a base station, a mobile station, and a wireless communication system to which the base station and the mobile station are applied, according to the present invention with reference to FIGS. 1 to 9. In the drawings, the same reference numerals are assigned to the same elements, and the overlapped descriptions will be omitted as necessary to clarify the descriptions.

First Embodiment

As illustrated in FIG. 1, a wireless communication system 1 according to the embodiment includes a base station 10, and "n number" of mobile stations 20_1 to 20_n (hereinafter may be collectively referred to as a reference numeral 20). Here, "n" is the maximum number of mobile stations that can be accommodated by the base station 10. The base station 10 periodically receives, from "m number" (m≤n) of registered mobile stations 20_1 to 20_m registered in the base station 10 among the mobile stations 20_1 to 20_n, for example the location information of the registered mobile stations 20_1 to 20_m via the shared channel.

Unregistered mobile stations 20_m+1 to 20_n that are unregistered in the base station 10 includes mobile stations that are not active although located in a cell 11 formed by the base station 10, and mobile stations that may enter the cell 11 in the future. Moreover, information that the base station 10 receives from the registered mobile stations 20_1 to 20_m is not limited to location information, but various information can be used. As an example of such information, cited are information on the status of the mobile station (connection or nonconnection with an external device, for example), sensing information acquired by the mobile station (the temperature around the mobile station, for example), information on an vacant-car state if the mobile station is mounted on a passenger transport vehicle such as a taxi, and the like.

Figure 2:
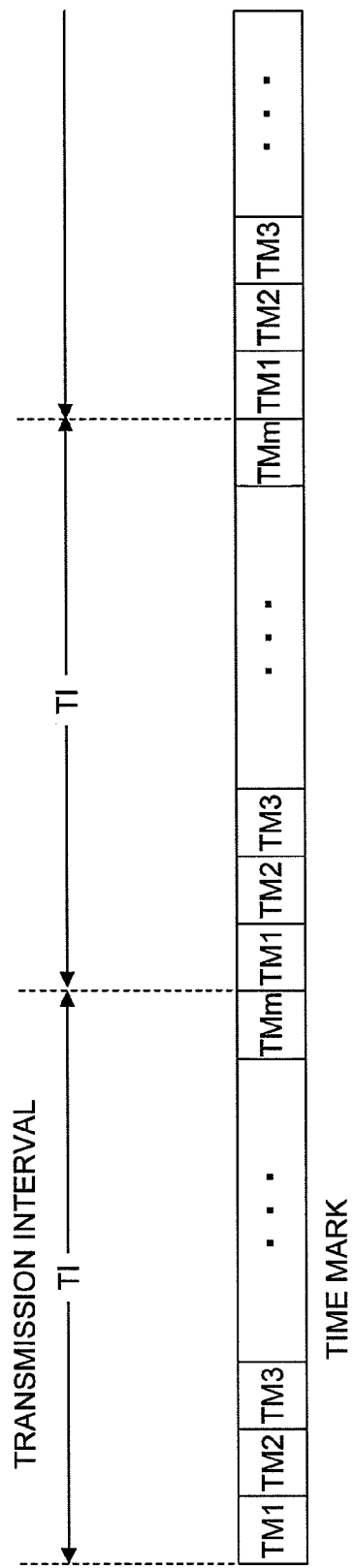
FIG. 2 is a view illustrating an example of the decision process of a transmission interval and the allocation process of a transmission timing at a base station according to the first embodiment of the present invention.

In terms of the operations, as illustrated in FIG. 2, the base station 10 determines a transmission interval TI of location information for each of the registered mobile stations 20_1 to 20_m in accordance with the number of the registered mobile stations, "m". Specifically, the base station 10 sets the transmission interval TI to a value "m times" longer than a time necessary for the registered mobile station to transmit the location information (hereinafter may be referred to as the transmission unit time). The transmission interval TI may include a predetermined margin time as will be described later.

Moreover, the base station 10 allocates any one of time marks TM1 to TMm (hereinafter may be collectively referred to as reference letters TM) as a transmission timing of location information for each of the registered mobile stations 20_1 to 20_m so as to be different among the registered mobile stations in the transmission interval TI.

The base station 10 then notifies the registered mobile stations 20_1 to 20_m of the transmission interval TI and their time marks TM. At this point, it is suitable that the base station 10 broadcasts the transmission interval TI to the cell 11. Specifically, the base station 10 sends out the transmission interval TI to a control channel. In this case, it is possible to more efficiently use the band of the control channel than a case where the transmission interval TI is unicast or groupcast to the registered mobile stations 20_1 to 20_m. The control channel may be mapped by time division on the same physical channel as the shared channel or may be mapped on a separate physical channel different from the shared channel. When the control channel is mapped on the same physical channel as the shared channel, the groupcast of the transmission interval TI leads to an effect of improving efficiency in transmission of location information.

On the other hand, the registered mobile stations 20_1 to 20_m periodically send out the location information to the shared channel in accordance with the transmission interval TI and the time marks TM.

In this manner, in the first embodiment, the interval of information transmission from the mobile station to the base station is not the maximum number of mobile stations that can be accommodated by the base station, but is set to a shorter interval in conformity with the number of mobile stations registered in the base station (in other words, is set to the number equivalent to the actual active mobile stations). Therefore, it is possible to further increase the frequency of transmission of the location information by the mobile station, and accordingly it is possible to significantly improve efficiency in information transmission compared with the transmission modes 1 and 2.

A detailed description will hereinafter be given of the specific configuration and operation examples of the base station 10 and the mobile station 20, which realize the above operations, with reference to FIGS. 3 to 8.

Figure 3:
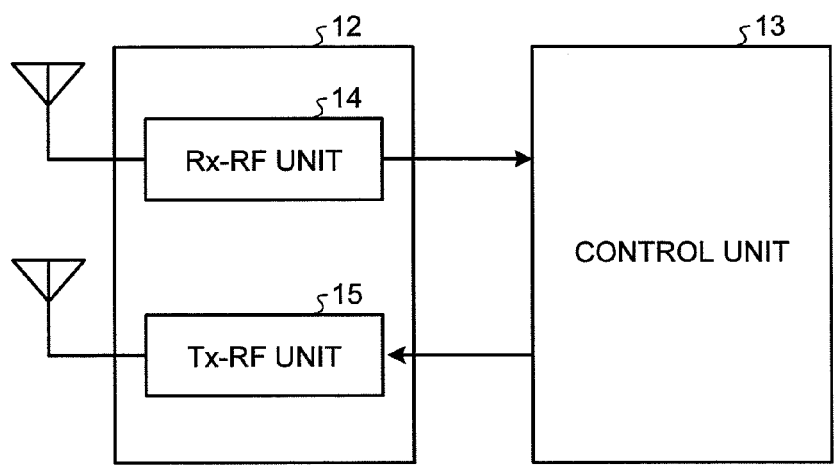
FIG. 3 is a block diagram illustrating a configuration example of the base station according to the first embodiment of the present invention.

As illustrated in FIG. 3, the base station 10 includes a communication unit 12 and a control unit 13.

Among them, the communication unit 12 has an Rx-RF unit 14 and a Tx-RF unit 15. The Rx-RF unit 14 performs processes including amplification, demodulation, and decoding on a wireless signal received via an antenna, and outputs a thus obtained data signal to the control unit 13. Moreover, the Tx-RF unit 15 performs processes including coding, modulation, and amplification on a data signal inputted from the control unit 13, and sends out a thus obtained wireless signal via an antenna. Two antennas are shown in the illustrated example; however, one antenna may be connected to the Rx-RF unit 14 and the Tx-RF unit 15 via a duplexer or the like.

Moreover, the control unit 13 controls the communication unit 12 so as to execute a process related to registration and deregistration of the mobile station 20, a decision process of the transmission interval TI, a process related to allocation and deallocation of the time mark TM, and a process of notifying the mobile station 20 of the transmission interval TI and the time mark TM, as will be described later. When the wireless communication system 1 is used for the above-mentioned use for displaying and monitoring the location of the mobile station on a map, the control unit 13 executes a process of relaying the location information to an external server to cause the base station 10 to function as a relay station too. If the server is capable of communicating by radio, the control unit 13 causes the Tx-RF unit 15 to transmit the location information to the server. On the other hand, if the server is not capable of communicating by radio, the control unit 13 causes, for example, an IP (Internet Protocol) communication module (not shown) to transmit the location information to the server.

Figure 4:
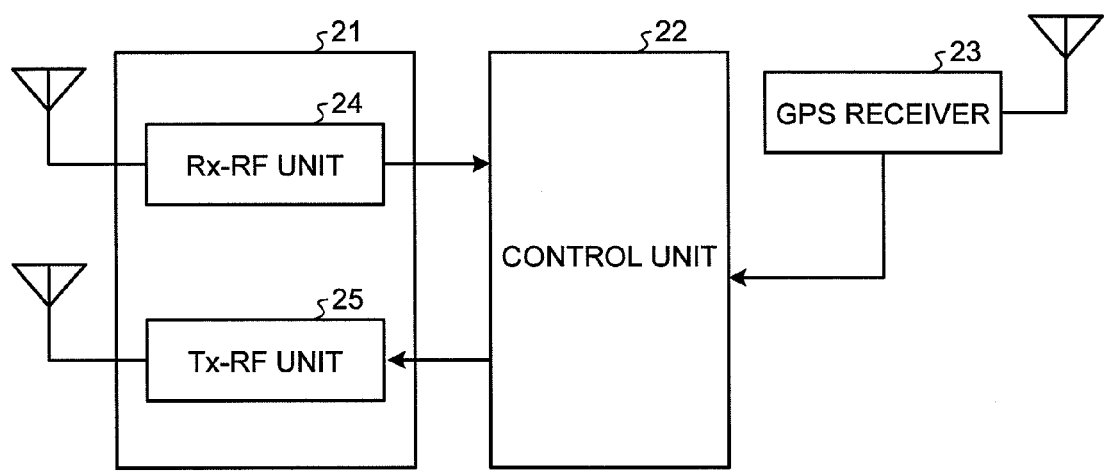
FIG. 4 is a block diagram illustrating a configuration example of a mobile station according to the first embodiment of the present invention.

On the other hand, as illustrated in FIG. 4, the mobile station 20 includes a communication unit 21, a control unit 22, and a GPS receiver 23.

Among them, the communication unit 21 has an Rx-RF unit 24 and a Tx-RF unit 25. The Rx-RF unit 24 performs processes including amplification, demodulation, and decoding on a wireless signal received via an antenna, and outputs a thus obtained data signal to the control unit 22. Moreover, the Tx-RF unit 25 performs processes including coding, modulation, and amplification on a data signal inputted from the control unit 22, and sends out a thus obtained wireless signal via an antenna. Two antennas are shown in the illustrated example; however, one antenna may be connected to the Rx-RF unit 24 and the Tx-RF unit 25 via a duplexer or the like.

Moreover, the control unit 22 controls the communication unit 21 so as to execute a process related to registration to and deregistration from the base station 10 and a process of receiving the transmission interval TI and the time mark TM, as will be described later. Moreover, when a timing indicated by the time mark TM arrives, the control unit 22 transfers the location information outputted from the GPS receiver 23 to the Tx-RF unit 25 to transmit the location information to the base station 10. The control unit 22 repeats the transmission operation in the cycle of the transmission interval TI.

A general GPS receiver may be used for the GPS receiver 23; accordingly, a detailed description thereof will be omitted. Naturally, the mobile station 20 may acquire the location information not using the GPS receiver 23 but using various kinds of radio navigation.

Next, a description will be given of the operation examples of the base station 10 and the mobile station 20 with reference to FIGS. 5 to 8.

Figure 5:
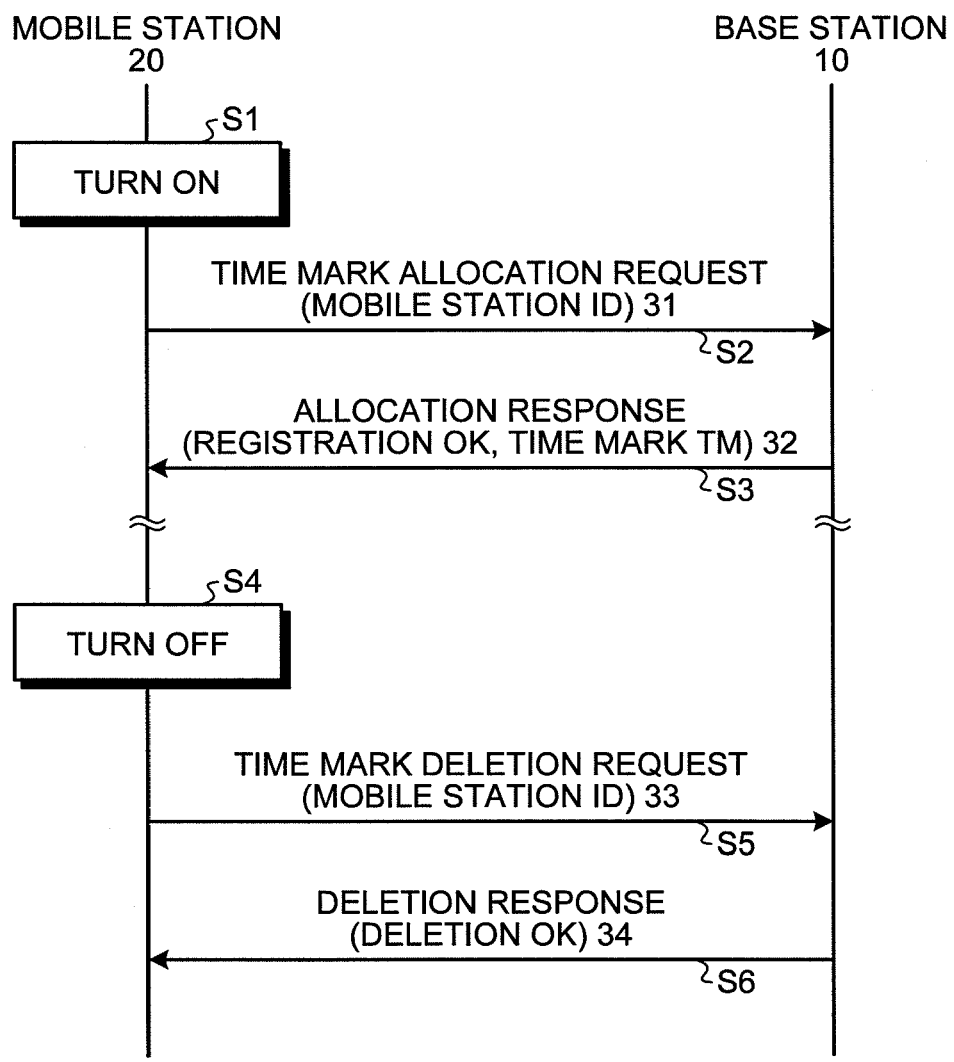
FIG. 5 is a sequence diagram illustrating an example of a registration and a deregistration process of the mobile station on the base station in the wireless communication system according to the first embodiment of the present invention.

As illustrated in FIG. 5, when the power is turned on to become active, the mobile station 20 executes a cell search (Step S1). If the cell 11 of the base station 10 is consequently detected, the mobile station 20 autonomously transmits a time mark allocation request 31 including of its own ID (identifier) to the base station 10 to request registration in the base station 10 (Step S2). The time mark allocation request 31 may be transmitted, triggered at various timings, not limited to at the time of power-up. Examples of such a timing include at the time of transmitting a message generated due to a user's operation on the mobile station 20 and at the time of entering the cell 11. However, it is suitable to autonomously transmit the time mark allocation request 31 at the time of power-up or at the time of entering the cell 11 (in other words, upon registration in the base station 10) because a timing when the mobile station 20 starts transmitting information is advanced and a user's operation is unnecessary.

Figure 6:
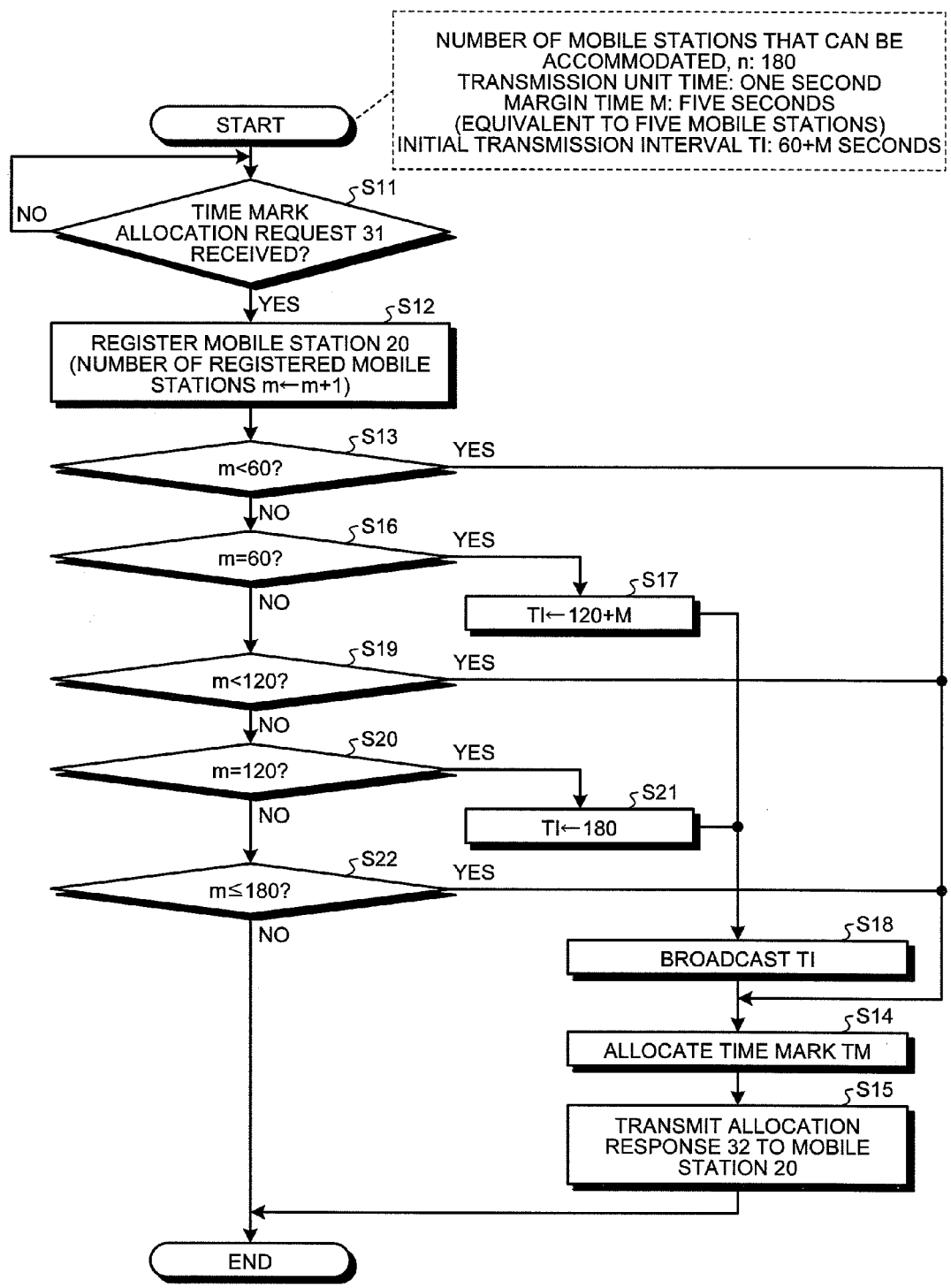
FIG. 6 is a flowchart diagram illustrating an operation example upon registration process at the base station according to the first embodiment of the present invention.

Upon receipt of the time mark allocation request 31, the base station 10 operates as illustrated in FIG. 6. In the example of FIG. 6, the number of mobile stations that can be accommodated by the base station 10, n, is set to "180", the transmission unit time of the mobile station 20 to "one second", a margin time M included in the transmission interval TI to "five seconds" (a time that the time marks TM can be allocated to five mobile stations), and an initial transmission interval TI at startup of the base station 10 to "60+M seconds" (an interval that the time marks TM can be allocated to 65 mobile stations in total), respectively. However, naturally these set values are simply examples to clarify the description. Moreover, in the example of FIG. 6, it is assumed that the base station 10 has already broadcast the initial transmission interval TI="60+M seconds" to the cell 11.

Specifically, firstly, the base station 10 receives the time mark allocation request 31 from the mobile station 20 (Step S11), and registers the mobile station 20 in the base station 10 (Step S12). More specifically, the base station 10 increments the number of the registered mobile stations, m, by "1". Moreover, the base station 10 stores the mobile station ID in a memory (not illustrated).

The base station 10 then judges whether or not the number of the registered mobile stations, m, has been increased to "60" (a number that is less by the number of mobile stations, "5", equivalent to the margin time than the number of mobile stations, "65", to which the time marks TM can be allocated in the transmission interval TI) (Step S13).

If the number of the registered mobile stations, m<"60" consequently is satisfied, the base station 10 allocates a unique time mark TM to the mobile station 20 (Step S14). Moreover, although illustration is omitted, the base station 10 stores the allocated time mark TM in the memory while associating the time mark TM with the mobile station ID.

The base station 10 then transmits an allocation response 32 indicating registration OK and including the allocated time mark TM to the mobile station 20 (Step S15 in FIG. 6 and Step S3 in FIG. 5).

Figure 7:
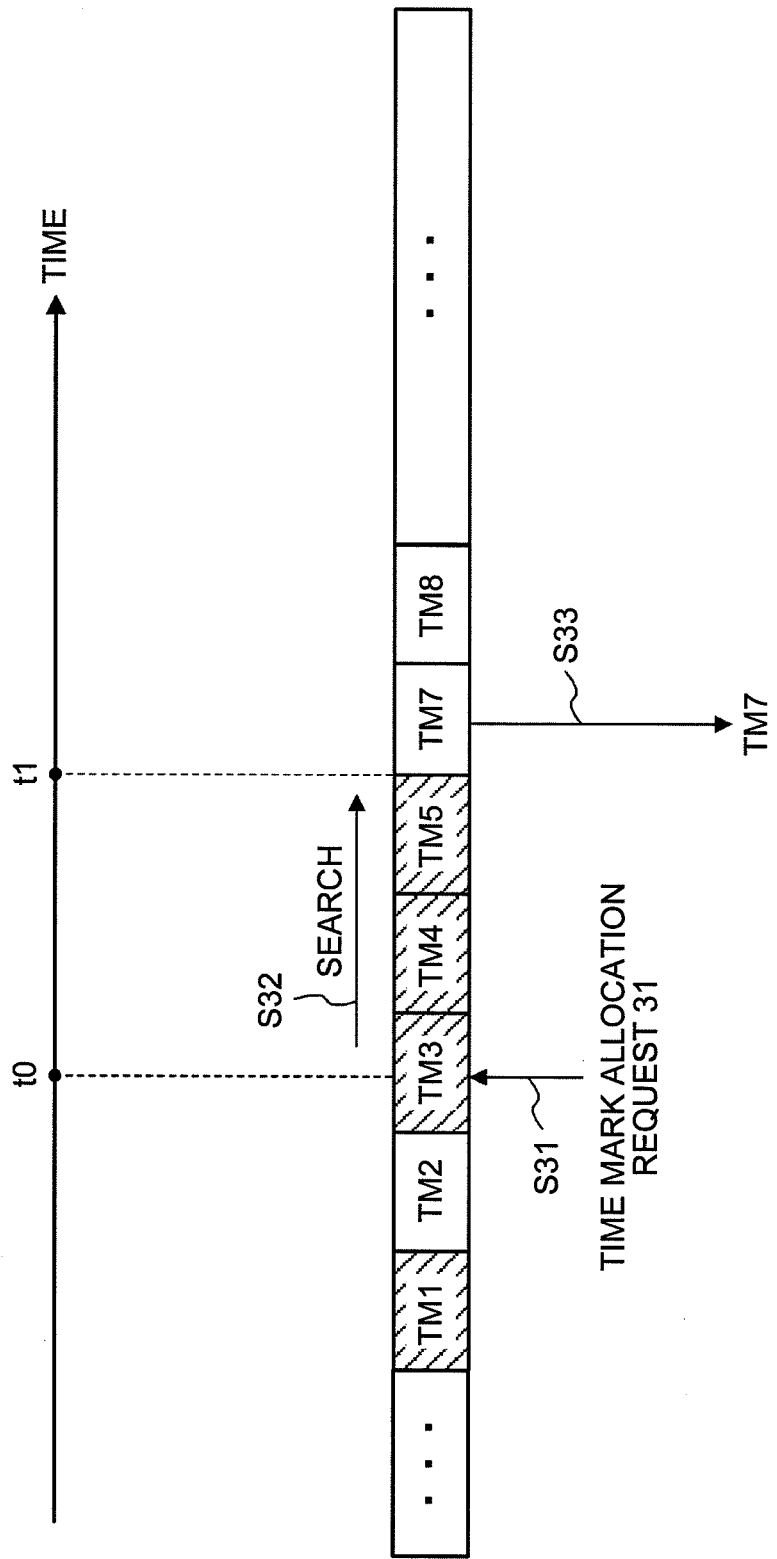
FIG. 7 is a view illustrating another example of an allocation process of a transmission timing at the base station according to the first embodiment of the present invention.

Here, it is suitable that the base station 10 allocates the time mark TM as illustrated in FIG. 7. Specifically, it is assumed that at a time t0 corresponding to a time mark TM3, the base station 10 receives the time mark allocation request 31 from the mobile station 20 (Step S31), and the time mark TM1 and time marks TM3 to TM5 have already been allocated to other mobile stations as illustrated by oblique lines in FIG. 7. At this point, the base station 10 searches the record in the memory to detect unallocated time marks TM2, TM7, TM8 . . . and extracts the time mark TM7 coming at the earliest time t1 among them (Step S32). The base station 10 then allocates the extracted time mark TM7 to the mobile station 20 (Step S33).

In this case, the mobile station 20 can start transmitting information immediately after registration in the base station 10. The time mark TM may be allocated in accordance with another algorithm as long as the time marks TM are different for each one of the registered mobile stations.

On the other hand, if the number of the registered mobile stations, m="60" is satisfied (Step S16), the base station 10 extends the transmission interval TI to "120+M seconds" (Step S17). The base station 10 then broadcasts the extended transmission interval TI to notify it to each one of the registered mobile stations again (Step S18). To put it another way, the base station 10 extends the transmission interval TI before the number of the registered mobile stations, m, reaches a limit number to which the time marks TM can be allocated.

Therefore, even if the number of the registered mobile stations, m, suddenly increases due to temporary variation in radio conditions (for example, even if mobile stations located on the boundary with the cell of an adjacent base station perform a handover to the base station 10 in unison), it is possible to prevent the base station 10 from missing a timing for notifying the transmission interval TI again. Therefore, it is possible for the registered mobile stations to continue transmitting information without a hitch.

The base station 10 then proceeds to the above Step S14 to allocate the time mark TM in the updated transmission interval TI. Moreover, the base station 10 proceeds to the above Step S15 to notify the allocated time mark TM to the mobile station 20.

Subsequently, while the number of the registered mobile stations, m<"120" is satisfied (Step S19), the base station 10 proceeds to the above Step S14 to allocate the time mark TM in the transmission interval TI. Moreover, the base station 10 proceeds to the above Step S15 to notify the registered mobile stations of the allocated time marks TM.

On the other hand, when the number of the registered mobile stations, m="120" is satisfied (Step S20), the base station 10 further extends the transmission interval TI to "180 seconds" (Step S21). The base station 10 then broadcasts the extended transmission interval TI sequentially via the above Steps S18, S14 and S15, and notifies the allocated time mark TM to the mobile station that has transmitted the time mark allocation request 31.

Subsequently, while the number of the registered mobile stations, m≤"180" is satisfied (Step S22), the base station 10 proceeds to the above Step S14 to allocate the time mark TM in the transmission interval TI. Moreover, the base station 10 proceeds to the above Step S15 to notify the allocated time mark TM to the mobile station that has transmitted the time mark allocation request 31.

Although not illustrated, when the number of mobile stations that can be accommodated, n, is further to be increased assuming that the above transmission unit time="one second", the transmission interval TI may be preferably extended not in units of "60 seconds" but in units of the seconds (minutes) being a factor of "3600 seconds (60 minutes)". In this case, it is possible to register "7200" mobile stations at the maximum with the base station 10 without allocating the time marks TM overlappingly.

Returning to FIG. 5, if a user turns off the power (Step S4), the mobile station 20 autonomously transmits a time mark deletion request 33 including the mobile station ID to the base station 10 before terminating the operation to request deregistration from the base station 10 (Step S5). The time mark deletion request 33 may be transmitted, by being triggered at various timings, not limited to at the time of turn off of power.

Figure 8:
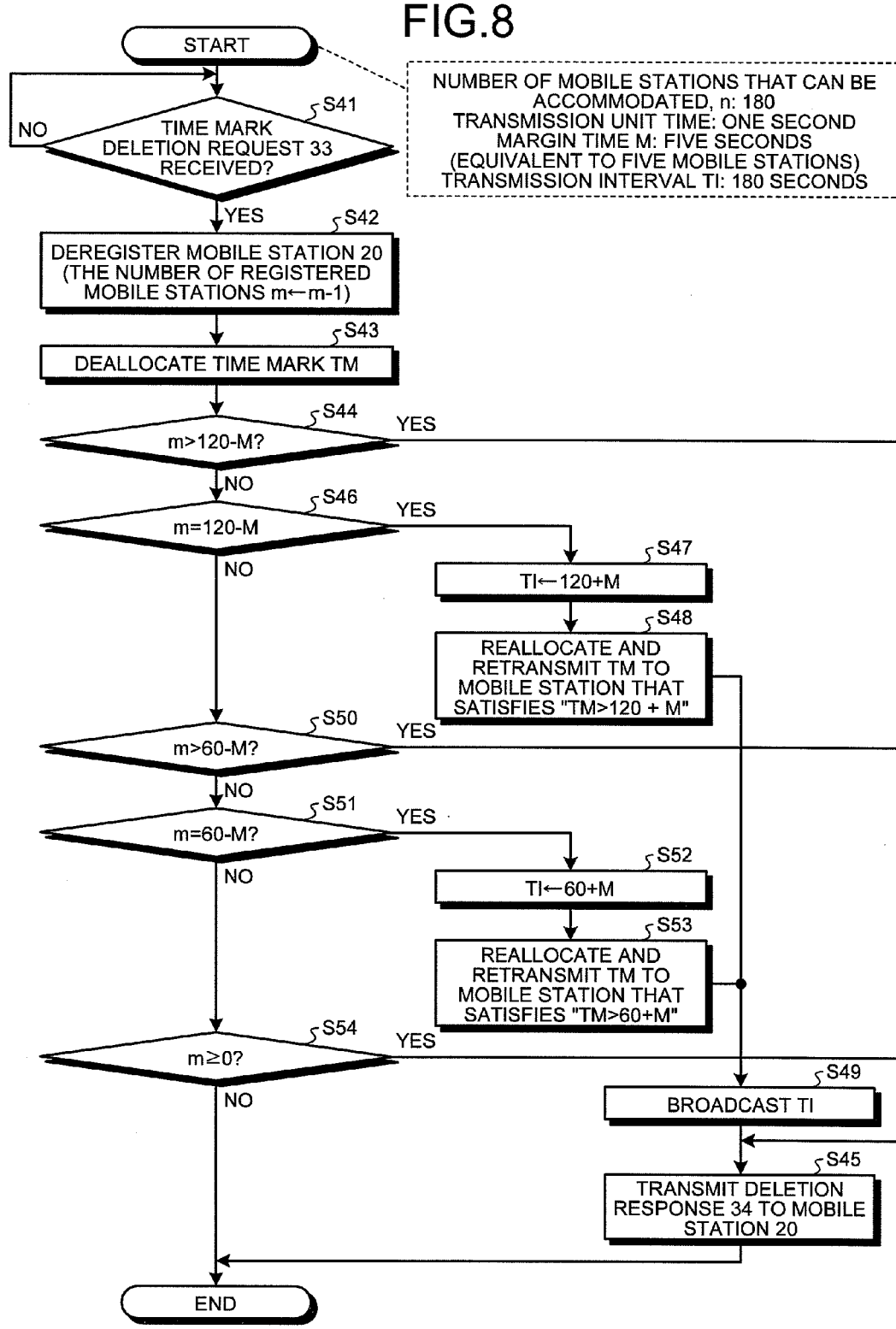
FIG. 8 is a flowchart diagram illustrating an operation example upon deregistration process at the base station according to the first embodiment of the present invention.

Upon receipt of the time mark deletion request 33, the base station 10 operates as illustrated in FIG. 8. In the example of FIG. 8, similarly to FIG. 6, it is assumed that the number of mobile stations that can be accommodated, is set to "180", the transmission unit time to "one second", and the margin time M to "five seconds", respectively. Moreover, the example of FIG. 8 represents a process that the transmission interval TI decreases from "180 seconds".

Specifically, firstly, the base station 10 receives the time mark deletion request 33 from the mobile station 20 (Step S41), and deregisters the mobile station 20 (Step S42). More specifically, the base station 10 decrements the number of the registered mobile stations, m, by "1".

The base station 10 then deallocates the time mark TM of the mobile station 20 (Step S43). More specifically, the base station 10 erases the mobile station ID and the time mark TM that is associated with the mobile station ID from the memory.

Here, the base station 10 sets the deallocated time mark TM as a candidate for allocation to a new registered mobile station. Therefore, it is possible to avoid the occurrence of an unnecessary idle period on the shared channel and a decrease in efficiency in information transmission.

The base station 10 then judges whether or not the number of the registered mobile stations, m, has been decreased to "120−M" (a number that is further less by the number of mobile stations, "5", equivalent to the margin time than the number of mobile stations, "120", to which the time marks TM can be allocated in the transmission interval TI) (Step S44).

As a result, if the number of the registered mobile stations, m>"120−M" is satisfied, the base station 10 transmits a deletion response 34 indicating deletion OK to the mobile station 20 (Step S45 in FIG. 8 and Step S6 in FIG. 5).

On the other hand, if the number of the registered mobile stations, m="120−M" is satisfied (Step S46), the base station 10 shortens the transmission interval TI to "120+M seconds" (Step S47). To put it another way, the base station 10 does not shorten the transmission interval TI until the number of the registered mobile stations, m, further decreases to a certain degree even if the number of the registered mobile stations, m, decreases and even if it becomes possible to shorten the transmission interval TI.

Therefore, even if the number of the registered mobile stations, m, increases or decreases due to temporary variation in radio conditions (for example, even if the registered mobile stations located on the boundary with the cell of an adjacent base station frequently perform a handover between the base station 10 and the adjacent base station), it is possible to prevent the base station 10 from shortening and extending the transmission interval TI and repeating the renotification of the transmission interval TI in a short period. Thus, it is possible to reduce a process load on the base station 10.

Moreover, if there exists a mobile station that satisfies the time mark TM>"120+M seconds" (a mobile station to which the time mark TM is allocated in the shortened period), the base station 10 reallocates and retransmits to the relevant mobile station the time mark TM in the shortened transmission interval TI (Step S48). Thus, it is possible to prevent different registered mobile stations from being provided with the same transmission timing.

The base station 10 then broadcasts the shortened transmission interval TI to notify it again to the registered mobile stations (Step S49). Moreover, the base station 10 proceeds to the above Step S45 to transmit the deletion response 34 to the mobile station 20.

Subsequently, while the number of the registered mobile stations, m>"60−M" is satisfied (Step S50), the base station 10 proceeds to the above Step S45 to transmit the deletion response 34 to the mobile station that transmitted the time mark deletion request 33.

On the other hand, when the number of the registered mobile stations, m="60−M" is satisfied (Step S51), the base station 10 further shortens the transmission interval TI to "60+M seconds" (Step S52).

Moreover, if there exists a mobile station that satisfies the time mark TM>"60+M seconds", the base station 10 reallocates and retransmits to the mobile station the time mark TM in the shortened transmission interval TI (Step S53). The base station 10 then proceeds to the above Step S49 to broadcast the shortened transmission interval TI. Moreover, the base station 10 proceeds to the above Step S45 to transmit the deletion response 34 to the mobile station that transmitted the time mark deletion request 33.

Subsequently, while the number of the registered mobile stations, m≥"0" is satisfied (Step S54), the base station 10 proceeds to the above Step S45 to transmit the deletion response 34 to the mobile station that transmitted the time mark deletion request 33.

Second Embodiment

Figure 9:
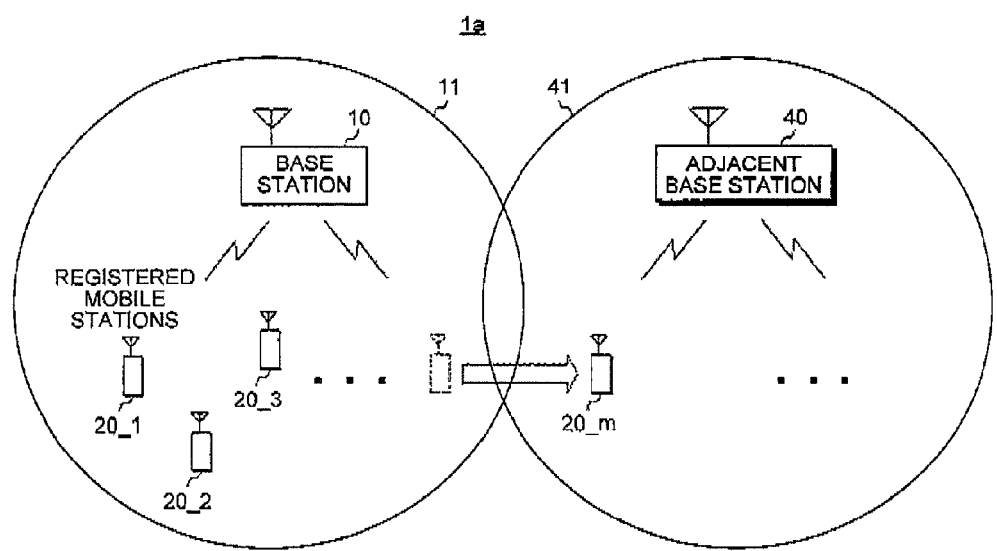
FIG. 9 is a block diagram illustrating a configuration example of a wireless communication system according to a second embodiment of the present invention.

As illustrated in FIG. 9, a wireless communication system 1a according to the second embodiment is different from that of the first embodiment in that another base station 40 is installed adjacently to the base station 10 in addition to the configuration illustrated in FIG. 1

In terms of the operations, the base station 10 monitors the registration situation of mobile stations in the adjacent base station 40. In the event of monitoring the registration situation, it is possible to adopt a general method. For example, the base station 10 acquires information on the registration situation from an external location management server (not shown). Otherwise, the base station 10 acquires information on the registration situation directly from the adjacent base station 40 via a backbone line. The adjacent base station 40 may have a function similar to that of the base station 10 or may be an already existing general base station.

Assume that for example, the registered mobile station 20_m out of the registered mobile stations 20_1 to 20_m moves into a cell 41 formed by the adjacent base station 40 and performs a handover to the adjacent base station 40. As a result of monitoring, the base station 10 detects the handover. More specifically, if detecting the ID of the registered mobile station 20_m stored in the memory from the information on the registration situation at the adjacent base station 40, the base station 10 judges that the registered mobile station 20_m has performed a handover to the adjacent base station 40.

At this point, the base station 10 executes processes similar to the above Steps S42 to S44 and S46 to S54 illustrated in FIG. 8 to deallocate the time mark TM of the registered mobile station 20_m. Moreover, the base station 10 sets the deallocated time mark TM as a candidate for allocation to a new registered mobile station.

In this manner, in the embodiment, even if the registered mobile station leaves the communication area of the base station, it is possible to avoid the occurrence of an unnecessary idle period on the shared channel and a decrease in efficiency in information transmission.

According to the present invention, it is possible to improve efficiency in information transmission from the mobile station to the base station via the shared channel.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless communication system comprising:
a plurality of mobile stations; and
a base station configured to periodically receive a predetermined kind of information from one or more registered mobile stations registered in the base station among the plurality of mobile stations via a radio channel shared among the registered mobile stations, wherein
each one of the mobile stations transmits an allocation request to request the base station to allocate and notify the transmission timing when power of the mobile station is turned on,
each one of the registered mobile stations transmits a deletion request to request the base station to deallocate the transmission timing upon deregistration from the base station when power of the registered mobile station is turned off,
the base station
registers the mobile station that has transmitted the allocation request when the allocation request is received by the base station,
deregisters the registered mobile station that has transmitted the deletion request when the deletion request is received by the base station,
determines a transmission interval of the information for the registered mobile stations in accordance with the number of the registered mobile stations,
allocates transmission timings of the information for the registered mobile stations to be different among the registered mobile stations in the transmission interval,
extends the transmission interval when the number of the registered mobile stations increases to a number smaller by a first predetermined number than the number of mobile stations to which the transmission timings can be allocated,
shortens the transmission interval when the number of the registered mobile stations decreases to a number smaller by a second predetermined number than the number of mobile stations to which the transmission timings can be allocated, and
notifies the registered mobile station of the transmission interval and the transmission timing, and
each one of the registered mobile stations periodically sends out the information to the radio channel in accordance with the transmission interval and the transmission timing.

2. The wireless communication system according to claim 1, wherein the base station is configured to broadcast the transmission interval to a communication area thereof to notify the transmission interval to each one of the registered mobile stations.

3. The wireless communication system according to claim 1, wherein the base station is configured to allocate to the registered mobile station the earliest coming transmission timing among unallocated transmission timings at the time of registration thereof.

4. The wireless communication system according to claim 1, wherein
the base station includes the deallocated transmission timing in a candidate for allocation to a mobile station to be registered anew.

5. The wireless communication system according to claim 1, wherein the base station is configured to
reallocate the transmission timings targeting a part of the registered mobile stations to which the transmission timings corresponding to the shortened period have been allocated, and
notify the part of the registered mobile stations of the reallocated transmission timings again.

6. The wireless communication system according to claim 1, wherein the base station is configured to
monitor a registration situation of a mobile station at another base station installed adjacently to the base station,
when the base station detects that the registered mobile station has been newly registered in the another base station as a result of monitoring, the base station is configured to deallocate the transmission timing, and
includes the deallocated transmission timing in a candidate for allocation to a new registered mobile station.

7. The wireless communication system according to claim 1, wherein
the information is location information of the registered mobile station.

* * * * *